(No Model.)
F. M. SCRAFFORD.
DEVICE FOR CATCHING HOGS.
No. 328,817. Patented Oct. 20, 1885.
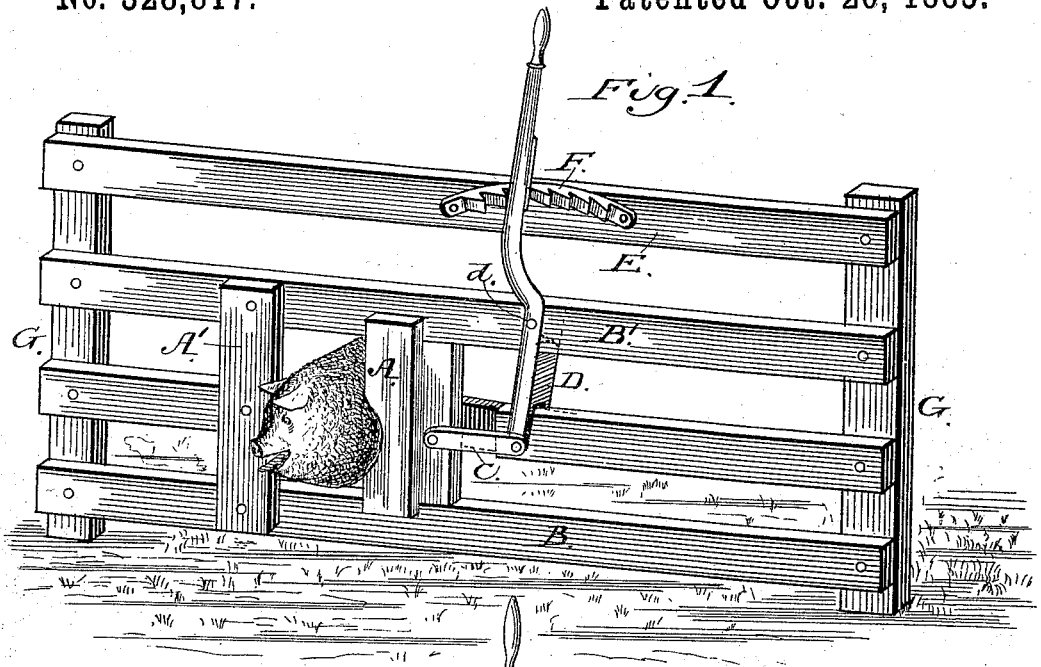
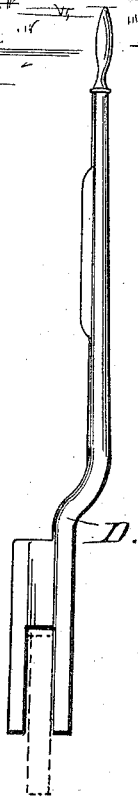
WITNESSES
P. W. Fowler
H. B. Applewhaite
INVENTOR
Frank M. Scrafford.
by A. H. Evans and Co.
Attorneys

UNITED STATES PATENT OFFICE.

FRANK M. SCRAFFORD, OF SENECA, KANSAS.

DEVICE FOR CATCHING HOGS.

SPECIFICATION forming part of Letters Patent No. 328,817, dated October 20, 1885.

Application filed July 21, 1885. Serial No. 172,211. (No model.)

*To all whom it may concern:*

Be it known that I, FRANK M. SCRAFFORD, a citizen of the United States, residing at Seneca, in the county of Nemaha, in the State of Kansas, have invented an Improved Device for Catching Hogs, of which the following is a full, clear, and exact description, reference being had to the accompanying drawings, forming part of this specification, in which—

Figure 1 is a perspective view of my invention. Fig. 2 is a view of the lever-arm detached.

My invention relates to devices for catching hogs for the purpose of ringing, marking, castrating, &c.; and it consists in the combination of devices hereinafter described and claimed.

To enable others skilled in the art to make and use my invention, I will now proceed to describe the exact manner in which I have carried it out.

In the drawings, A represents a vertical sliding bar made of any suitable material, but preferably of wrought or cast iron. This bar is formed with grooves at each side, into which loosely fit the horizontal bars B B', thus allowing the vertical bar to readily slide backward or forward between the horizontal bars.

To the center of the vertical bar A is pivoted one end of the pitman C, the other end of the pitman being pivoted to the lower end of the bifurcated lever-arm D, which in turn is pivoted at $d$ to the horizontal bar B'.

The upper portion of the lever-arm is provided with a beveled edge, adapted to fit into the notches in the rack-bar F, located on the upper horizontal bar, E, by which means the lever-arm is held in any desired position.

The bars B B' are also securly connected to the vertical bar A' at such a distance from the sliding bar A that when the latter is drawn back by the lever-arm a sufficient opening is formed between the two bars for the easy passage of a hog. The horizontal bars are rigidly secured to the main posts G.

It is evident that the catcher thus constructed may be introduced anywhere as a part of a fence or as a portion of a pen in which the hogs are to be inclosed, and the operation of my catcher is as follows: The lever-arm being thrown forward the vertical sliding bar A is drawn back sufficiently to allow the hog to pass the opening formed between the vertical bars A A'. The hog to be caught is then driven up, and as soon as he puts his head through the opening the man in charge of lever-arm D pulls it back until the sliding bar has slipped forward and caught the hog by the neck, holding him between the bars A and A' as long as may be required. As soon as the hog is securely caught, the lever-arm is secured in the rack-bar F, where it remains until the hog is to be released.

Having thus explained my invention, what I claim as new, and desire to secure by Letters Patent, is—

The improved hog-catcher herein described, consisting, essentially, of the vertical sliding bar A, horizontal bars B B', pitman C, and bifurcated lever-arm D, in combination with the horizontal bar E, rack-bar F, vertical bar A', and posts G, all constructed to operate substantially as and for the purpose set forth.

FRANK M. SCRAFFORD.

Witnesses:
   CHAS. G. SCRAFFORD,
   ABIJAH WELLS.